Figure 1:
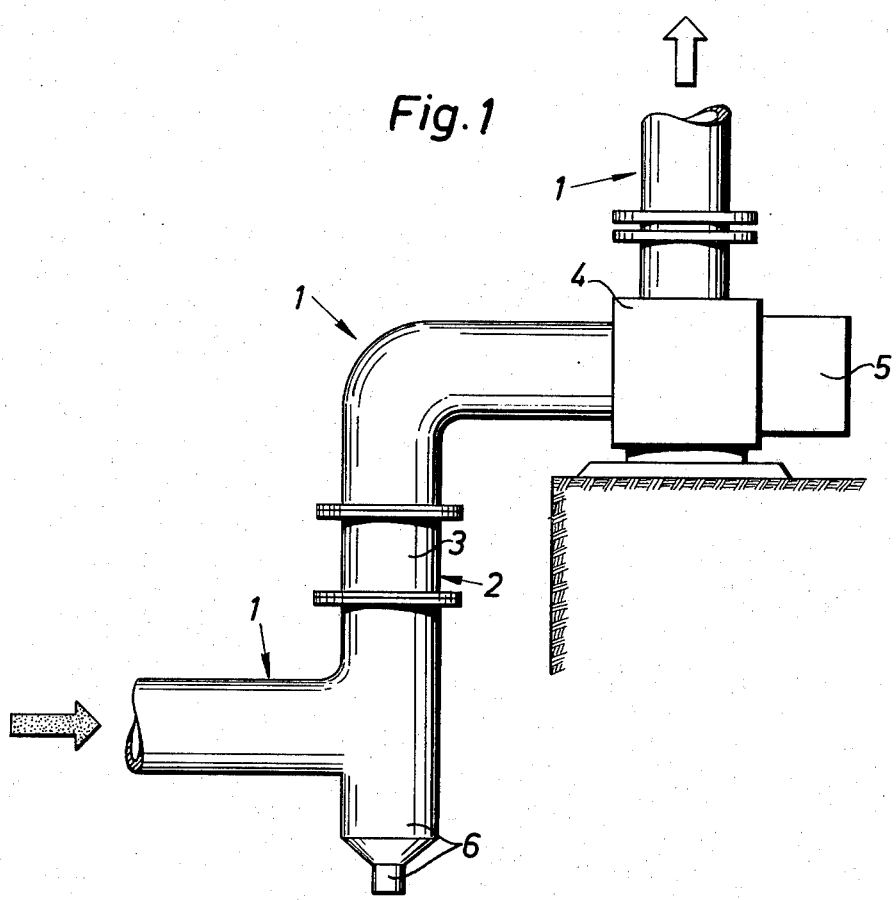

United States Patent [19]
Filén

[11] 3,926,598
[45] Dec. 16, 1975

[54] APPARATUS FOR SEPARATING, COLLECTING AND REMOVING SULPHURIC ACID FUMES AND THE LIKE FROM EVACUATION AIR

[75] Inventor: Björn G. O. Filén, Stockholm, Sweden

[73] Assignee: AB Essve Produkter, Stockholm, Sweden

[22] Filed: Oct. 24, 1974

[21] Appl. No.: 517,607

[30] Foreign Application Priority Data
Nov. 5, 1973 Sweden .................... 7314995

[52] U.S. Cl. ............ 55/385; 55/97; 55/512; 136/180
[51] Int. Cl.² ..................................... B01D 46/00
[58] Field of Search ........ 55/97, 512, 233, DIG. 25, 55/385; 261/94–98; 136/179, 180

[56] References Cited
UNITED STATES PATENTS

| | | | |
|---|---|---|---|
| 1,770,974 | 7/1930 | Everett | 136/179 |
| 3,066,462 | 12/1962 | Yap et al. | 55/97 |
| 3,246,639 | 4/1966 | Oliver | 55/512 |
| 3,352,778 | 11/1967 | Brink, Jr. et al. | 55/185 |
| 3,788,043 | 1/1974 | Dorr et al. | 55/259 |

FOREIGN PATENTS OR APPLICATIONS
472,634  2/1928  Germany
341,421  12/1971  Sweden

*Primary Examiner*—Bernard Nozick
*Attorney, Agent, or Firm*—Dorfman, Herrell and Skillman

[57] ABSTRACT

A apparatus for separating sulphuric acid fumes from ventilating air, for example the air discharged from battery-charging cabinets. The apparatus uses as an agglomerating-separating medium, a bed of long, unbroken, sharp-edged turnings of PVC (polyvinyl chloride) such as resulting from machining of PVC parts. The air is exhausted through the bed turbulently and the sulphuric acid agglomerates, forms liquid drops, and is drained from the bed. The battery-charging cabinets include a triangular chamber above each battery. Each chamber is filled with the PVC turnings and is arranged to drain the accumulated sulphuric acid from the chamber without entrainment in the ventilating air passing through the chamber.

4 Claims, 2 Drawing Figures

APPARATUS FOR SEPARATING, COLLECTING AND REMOVING SULPHURIC ACID FUMES AND THE LIKE FROM EVACUATION AIR

The present invention relates to apparatus adapted to separate, collect and remove sulphuric acid fumes from evacuation air, for instance in conjunction with charging of lead accumulators in closed spaces in battery charging cabinets.

In the charging of lead accumulators the electrolyte in the form of sulphuric acid and distilled water often becomes violently agitated by the evolution of gas towards the end of the charge. On boost charging it often happens that the electrolyte boils and in both cases large quantities of gases and fumes are produced. Having regard both for the working personnel — the sulphuric acid in the gas evolved both destroys clothing and injures the skin by contact and causes unhygienic conditions for lungs and eyes in the event of a lengthy stay in the battery charging room — as also for environmental pollution through attack by the evacuated air on vegetation and metallic surfaces, especially of aluminium, which are discoloured and often gradually and unnoticeably corrode at places where ventilation pipes for evacuated air containing sulphuric acid emerge — it is an urgent matter to eliminate and render such sulphuric acid fumes innocuous. The object of the invention is by simple but effective means to solve this important problem.

The invention is characterized in that the evacuation air is collected over essentially the entire surface of the source of the noxious fumes and is led to and caused under turbulent flow to pass a closed container filled with long, unbroken, sharp-edged turnings of PVC (polyvinyl chloride), in the which container the sulphuric acid molecules are split by the edges of the turnings and thus separated from the evacuation air, are caused to agglomerate (adhere to one another), and accumulate on the surface of the turnings, collect on the bottom of the container and are led off to a receptacle.

The apparatus according to the invention is not since the separation material placed in the container, i.e., the long, unbroken, sharp-edged turnings of PVC (polyvinyl chloride), is obtainable as waste product in the machining of PVC parts. The latter are now very widely used in industry and crafts. The longitudinal edges of the turnings may be regarded as knife-edges, which in turn have been found to consist of a large number of smaller edges and points in the same way as a razor-blade, the edge of which at about 1000 × magnification also exhibits a jagged contour. The action of the long PVC turnings with their special shape is presumed to be due to the fact that, when the evacuation air with the gas mist turbulently flows through the container against the sharp-edged PVC turnings, the sulphuric acid molecules are cut away from the gas mist. The evacuation air with the gas obtains its speed of flow from a fan in the evacuation channel and the flow of the evacuation air is also assisted by the rise of the hydrogen in the gas which is liberated in the charging process. The sulphuric acid molecules adhere to the surface of the elongated PVC turnings and are successively added to other molecules to form a drop which in turn combines with other drops into a stream which is collected in a receptacle. Surprisingly enough, it has been found that this separation effect does not take place if the evacuation air and gas are caused to pass through a container filled instead with a granulate of round or oval PVC particles. It can therefore not be considered to be solely the surface enlargement which is of decisive importance but rather the special shape of the long, unbroken turnings of PVC. It has also been found that short, thick, broken turnings both caused an unacceptably high pressure drop and were unable to separate sulphuric acid.

The invention in particular relates to a charging cabinet for lead accumulators, the cabinet having a number of decks of shelves for the accumulators and being equipped with means for venting of each deck. The device is characterized in that the means for venting of each deck in, known manner consists of a perforated baffle-plate forming with the shelf of the deck above a space of triangular cross-section communicating with an evacuation channel, and that the triangular space is used as sulphuric acid separator filled with a number of long, unbroken, sharp-edged turnings of PVC, in addition to which the said baffle-plate communicates at the rear of the cabinet with a slot serving as venting channel and connected at the top to said evacuation channel and at the bottom emerging in the known manner through a collecting pipe into a receptacle for separated sulphuric acid.

The invention will now be described with reference to the attached drawings,

FIG. 1 showing an embodiment with separate container for the turnings, and

Figure 2:
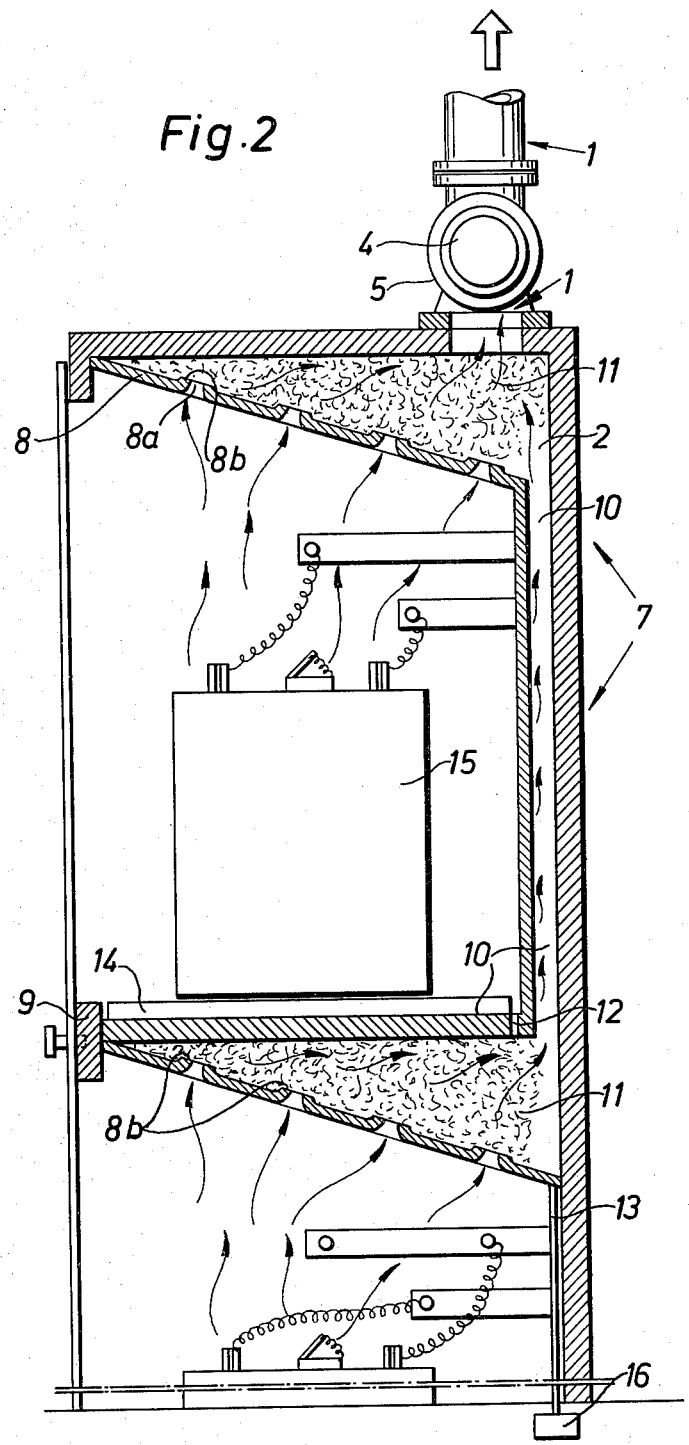

FIG. 2 an embodiment with a charging cabinet with a number of decks for lead accumulators.

In FIG. 1, 1 denotes an evacuation channel from a space in which are generated sulphuric acid fumes accompanying the evacuation air. The channel is furnished with a container 2 for turnings 3 (not illustrated in detail) of the aforementioned kind, i.e., long, unbroken, sharp-edged turnings of PVC (polyvinyl chloride). 4 denotes an exhaust fan, 5 an electric driving motor for the fan, and 6 a liquid trap with drain for sulphuric acid formed by agglomeration of drops of free sulphuric acid separated in container 2. Fan and motor may also be combined into a unit placed in the evacuation channel over the separator, i.e., the container with turnings.

In FIG. 2, 7 denotes a charging cabinet for lead accumulators 15 as described, for example, in Swedish Pat. No. 341,421. In accordance therewith the cabinet contains shelves 9 on a number of decks situated one above the other, carrying rows of the lead accumulators which rest on gratings 14 of wave-shaped cross-section, and sloping towards the rear of the cabinet, so preventing the accumulators from standing in spilt battery acid. Above the accumulators, on every deck, there are obliquely downward sloping baffle-plates 8 with holes 8a and with flanges 8b. The baffle-plates from a triangular space 11 for reception of turnings. 10 denotes a slot along the rear of the battery charging cabinet. Through the slot, each deck communicates upwards with the evacuation channel 1, which in this case as well is assumed to be equipped with a motor-driven exhaust fan 4, 5. 12 denotes a drainage pipe on each deck 9 for spilt sulphuric acid. 13 is a pipe for collection of separated sulphuric acid in a replaceable flask 16 on the bottom of the charging cabinet.

Through the invention and the arrangement of a filter of the kind indicated, which separates the sulphuric acid fumes, the most aggressive and corrosive fumes, it is now possible to use in battery charging cabinets standardized, simple and cheap fans of sheet steel and aluminium. Nor need such severe requirements be placed on the material in ventilation pipes and channels installed beyond the sulphuric acid separator.

The invention is also applicable in, for example, the galvanizing industry, in chemical laboratories and, in general, within industry which works with sulphuric acid solutions.

I claim:

1. Apparatus for separating, collecting and removing sulphuric acid fumes from air evacuated from battery-charging cabinets, consisting of a closed container having a bottom surface, long, unbroken, sharp-edged turnings of polyvinyl chloride filling said container, duct means to cause the evacuation air having sulphuric acid fumes therein to flow turbulently through said container whereby the sharp edges of the turnings are impinged by the sulphuric acid fumes and cause these fumes to agglomerate and form drops on the surface of the turnings, means to collect and lead off the drops of sulphuric acid from the bottom surface of the container, and a receptacle for receiving the collected drops from said collection means.

2. Apparatus for separating, collecting and removing sulphuric acid fumes from air evacuated from battery-charging cabinets having a series of shelves for supporting the batteries and means for evacuating air from each shelf, the improvement wherein said evacuation means comprises a perforated baffle plate disposed at an angle to the horizontal below the shelf above said battery to form a space of triangular cross-section, an evacuation channel connected to said space to withdraw air from the space and from the battery on the shelf through said perforated baffle plate, a number of long, unbroken sharp-edged turnings of polyvinyl chloride disposed within said triangular space and over the entire cross-section of the cabinet, whereby the air evacuated from said batteries in said cabinet, being laden with sulphuric acid fumes, impinges against the sharp edges of said turnings so that the sulphuric acid fumes may agglomerate on the surface of said turnings and form drops which are collected on the upper surface of said perforated baffle plate, a collecting pipe connected to the lowermost part of said upper surface of said plate for leading off the sulphuric acid collected thereon.

3. Apparatus according to claim 2 wherein said perforated baffle plate has holes therethrough with flanges surrounding the holes and projecting upwardly from the bottom surface of the triangular space to direct the evacuation air into said space without passing through the liquid sulphuric acid collected on said bottom surface.

4. Apparatus according to claim 2 including a receptacle for the collected sulphuric acid, said receptacle being positioned below said perforated plate and connected to the lower end of said collecting pipe.

* * * * *